Figures 1, 2:
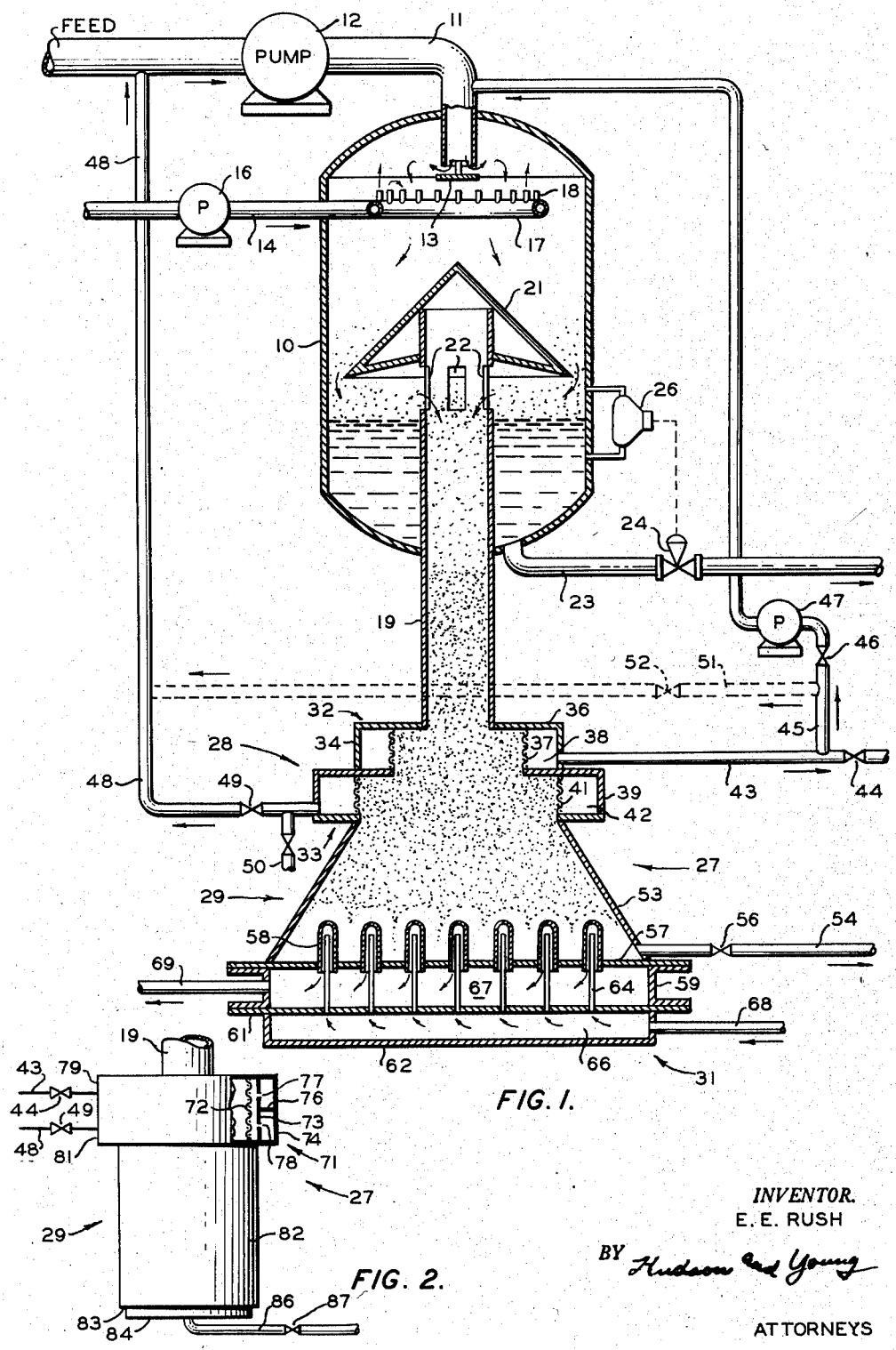

June 16, 1959     E. E. RUSH     2,890,938

FRACTIONAL CRYSTALLIZATION APPARATUS

Filed Dec. 13, 1954

INVENTOR.
E. E. RUSH

BY *Hudson and Young*

ATTORNEYS

United States Patent Office 2,890,938
Patented June 16, 1959

2,890,938

FRACTIONAL CRYSTALLIZATION APPARATUS

Elton E. Rush, McGregor, Tex., assignor to Phillips Petroleum Company, a corporation of Delaware Application December 13, 1954, Serial No. 474,811

5 Claims. (Cl. 23—273)

This invention relates to the separation and purification of components of a liquid multi-component mixture. In one of its more specific aspects, it relates to the separation and purification of components of a liquid multi-component mixture by fractional crystallization. In another of its more specific aspects, the invention relates to a method for forming crystals in a fractional crystallization process. In still another of its more specific aspects, it relates to fractional crystallization apparatus utilizing improved means for forming crystals in combination therewith.

This application is a continuation-in-part of my copending U.S. application Serial No. 375,516, filed August 20, 1953.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermally unstable substances, separation by crystallization may well be the only method which can be advantageously employed.

As well as offering perhaps the only practicable method of separation, the crystallization method offers the further advantage of being the only separation method which theoretically gives a pure product in a single stage of operation. In actual practice, however, the crystals obtained from a solution of several components will be impure because of the occlusion of mother liquor within the crystal interstices. In the conventional fractional crystallization processes, the crystal yield from one batch crystallization is redissolved in a solvent or remelted and again crystallized to effect further purification. The recrystallized product will have less impurity since the concentration of impurity in the new liquor is less than in the previous liquor of crystallization. Such processes require a large amount of equipment and floor space for their operation with resulting high operating expenditures in terms of labor and equipment costs. Furthermore, in these types of processes, the purity of the product is limited by the number of stages through which the process is carried.

More recently, a continuous method of separating and purifying liquid multi-component mixtures has been advanced which overcomes the disadvantages of conventional fractional crystallization processes. This method involves cooling a liquid multi-component mixture from which the separation is to be made so as to form crystals of at least the higher melting component and thereafter separating crystals from mother liquor. The crystals are then introduced into a purification column in one end of which a melting section is maintained. By mechanical means the crystals are moved through the column toward the melting section where the crystals are melted. A portion of the melt is withdrawn as product while the remainder is displaced countercurrently to the movement of crystals and in intimate contact therewith so as to remove the occluded impurities. In my copending U.S. application Serial No. 375,516, filed August 20, 1953, I have proposed a fractional crystallization process in which the crystals separated from the mother liquor are moved downwardly through a purification zone by the combination of gravity and the hydraulic force of the feed liquid entering the top of the column containing the purification zone in the lower end portion thereof.

The method most commonly used to form crystals in fractional crystallization processes involves indirect refrigeration whereby a heat exchange fluid is passed through a chiller in indirect heat exchange relation with the feed mixture. Because the crystals tend to form on the walls of the chiller, it becomes necessary to provide the chiller with scrapers to remove the crystals. It would greatly simplify the process and provide a more efficient operation if a means and method for crystal formation were provided which would make possible elimination of the scrapers. In my aforementioned copending U.S. application, I have proposed a direct refrigeration method for forming crystals wherein a liquid refrigerant, such as propane, introduced with the feed mixture directly into a cooling zone is evaporated, thereby cooling the mixture to the temperature necessary to form the crystals. In accordance with this invention, another method for forming crystals in fractional crystallization processes is proposed which makes possible the elimination of bulky scraped surface chillers.

The following are objects of the invention:

It is an object of the present invention to provide an improved process for the separation and purification of multi-component mixtures by fractional crystallization.

Another object of the invention is to provide improved apparatus for the separation and purification of multi-component mixtures by fractional crystallization.

A further object of the invention is to provide an improved process for the formation of crystals in fractional crystallization processes.

A still further object of the invention is to provide an improved apparatus for the formation of crystals in fractional crystallization processes.

Still other objects and advantages will become apparent to those skilled in the art from the following disclosure.

Broadly speaking, the present invention resides in improved fractional crystallization apparatus and in a fractional crystallization process which comprises directly contacting a feed mixture with droplets of a cold liquid refrigerant in a cooling zone and thereafter allowing the resulting slurry of crystals and mother liquor to overflow from the cooling zone into a purification zone. The crystals are separated from mother liquor in the upper portion of the purification zone and then moved therethrough toward a melting zone maintained in one end of the purification zone at a temperature at least as high as the melting point of the crystals. On entering the melting zone, the crystals are melted and a portion of the resulting liquid is withdrawn as product. The remainder of the liquid is displaced countercurrently to movement of crystals and in intimate contact therewith so as to remove occluded impurities.

The process and apparatus of this invention are applicable to a vast number of simple binary and complex multi-component systems. The invention is particularly applicable to the separation of hydrocarbons which have practically the same boiling points, and are, therefore, difficult to separate by distillation. Where high boiling organic compounds are concerned, separation by distillation is often undesirable because many such compounds are unstable at high temperatures. Specific examples of organic systems to which this invention is applicable are recited in U.S. application, Serial No. 166,992, filed June 9, 1950, now U.S. Patent No. 2,747,001, and of particular importance, there may be mentioned separation of systems containing xylenes, systems containing cyclohexane, systems containing normal paraffins, and systems containing benzene, and the like. Thus, it has been found that para-xylene can be separated from a multicomponent mixture comprising isomeric alkyl benzenes, that benzene can be separated from a mixture comprising a paraffinic hydrocarbon and benzene, and that cyclohexane can be separated from a mixture comprising a paraffinic hydrocarbon and cyclohexane. Other organic chemicals that may be mentioned include pyridines, dimethylphthalates and fatty acids.

In certain cases, it may also be desirable to recover the mother liquor separated from the crystals as a product of the process. This situation arises where it is desired to increase the concentration of a dilute solution. The desired degree of concentration can be closely controlled by varying the amount of liquid passed upwardly through the downwardly moving mass of crystals. This aspect of this invention is in general applicable in those instances where it is desired to increase the concentration of a solution by removing at least a portion of the solvent therefrom.

For a more complete understanding of the invention, reference may be had to the following description and the drawing, in which:

Figure 1 is an elevational view, partly in section, of one modification of the apparatus of the invention; and Figure 2 is a partial elevational view, partly in section of another modification of the invention.

Referring to the drawing and in particular to Figure 1, one modification of the fractional crystallization apparatus of the invention is illustrated which comprises an enclosed shell 10 which serves as the cooling chamber of the apparatus. A feed inlet conduit 11 containing pump 12 and connected to the upper end portion of shell 10 extends thereinto a substantial distance. Attached to the end of inlet conduit 11 is a horizontal baffle member 13 which operates to deflect the feed mixture as it leaves the conduit and to prevent brine from entering the conduit. Brine inlet line 14 containing pump 16 is connected to header member 17 which is positioned a short distance below the end of feed inlet conduit 11. Header member 17 is fitted with a plurality of nozzles 18 by means of which the brine is sprayed into the cooling chamber as fine droplets.

Conduit 19, which is connected to the lower end portion of shell 10, extends upwardly into the shell to a point a substantial distance above the bottom of the shell. A substantially conical baffle member 21 affixed to the upper end of conduit 19 has its periphery spaced apart from the walls of the shell. It is to be understood that the baffle member can be other than conical in shape, e.g., pyramidal, so long as the member deflects the downwardly flowing material away from conduit 19 and into the lower portion of shell 10. The upper end portion of conduit 19 is provided with a plurality of openings or slots 22 through which the slurry of crystals and mother liquor can flow into the conduit. A brine outlet line 23 containing flow control means 24 is connected to the lower end portion of shell 10. A phase line controller 26 adapted to maintain a phase line within shell 10 below the level of openings 22 is operatively connected to shell 10 and to flow control means 24.

The lower end of conduit 19 is attached to the upper end of separation and purification column 27 comprising a filter section 28, a purification section 29 and a heat exchange means 31. The filter section as illustrated comprises an upper filfiter 32 and a lower filter 33. Upper filter 32 comprises a cylindrical member 34 fitted with a closure member 36 to which conduit 19 is attached and having a filter screen 37 positioned therein so as to form an annular space 38. Lower filter 33 comprises a second cylindrical member 39 somewhat larger in diameter than cylindrical member 34 and also having a filter screen 41 positioned therein so as to form an annular space 42. Outlet line 43 containing valve 44 and connected to upper filter 32 is for the withdrawal of liquid from the upper filter zone. Line 45 containing valve 46 and pump 47 and connected to line 43 provides means for recycling liquid to feed inlet conduit 11 on the discharge side of pump 12. Line 48 containing valve 49 and connected to lower filter 33 provides means for recycling liquid removed from the lower filter zone to feed inlet conduit 11 on the suction side of pump 12 while line 50 provides means for withdrawing liquid which it is not desired to recycle. By means of line 51 containing valve 52 liquid removed from upper filter 32 can also be recycled through line 48 to feed inlet conduit 11 on the suction side of pump 12.

The purification section 29 of the separation and purification column comprises a frusto-conical member 53 open at its upper end to lower filter 33. A product outlet line 54 containing valve 56 is connected to the lower portion of the purification section. The lower end of the purification section is closed by closure member 57 having positioned therein a plurality of dome-like members 58 which extend from the closure member into the lower portion of the purification section. Attached to closure member 57 is a shortened cylindrical member 59 closed at its lower end by closure member 61 which has openings therein positioned below each of the dome-like members 58. A second shortened cylindrical member 62 closed at its lower end is attached to closure member 61. Pipes 64 extend from the openings in closure member 61 upwardly into dome members 58, thereby putting space 66 in communication with the inner portion of the dome members and space 67. Inlet line 68 is connected to cylindrical member 62 while outlet line 69 is connected to cylindrical member 59. While the separation and purification column as described above comprises a purification section having a frusto-conical shape and a bayonet-type heat exchange means, it is to be understood as will become more apparent upon consideration of Figure 2 that it is not intended to limit the invention to this specific apparatus.

Referring to Figure 2 of the drawing, there is illustrated another embodiment of the present invention. Reference numerals previously utilized in conjunction with the description of Figure 1 are used with Figure 2 to designate corresponding elements. Conduit 19 which extends from the cooling chamber as shown in Figure 1 is connected to the upper end of filter section 71. Filter section 71 comprises a filter screen 72, substantially cylindrical in shape positioned within cylindrical member or tube 73 which in turn is surrounded by jacket 74. The annular section between tube 73 and jacket 74 is divided into an upper and a lower part by ring member 76. Tube 73 is perforated as by an upper row of holes 77 and a lower row of holes 78, the holes being spaced around the circumference of the tube near its top and bottom. By this arrangement of elements as described, filter section 71 is in effect divided into upper and lower filters 79 and 81, respectively. It is also within the contemplation of the invention to utilize a single filter instead of the upper and lower filters in which case the mother liquor and the stream comprising displaced impurities are withdrawn from the separation and purification column through the same line.

Purification section 29 is connected to filter section 71 and comprises a substantially vertical column 82 closed at its lower end by closure member 83. A heat exchange means is provided at the lower end of column 82 in order to maintain a relatively high temperature at that end. As illustrated, the heat exchange means is an electric heater 84 positioned next to closure member 83, but other means may be employed. For example, a heat exchange means as shown in Figure 1 can be used or a coil through which a heat transfer medium is circulated can be disposed within or around column 82 at its lower end, or an electric heater may be provided to extend into the end of the purification column. Outlet line 86 containing valve 87 is connected to the lower end of column 82 for withdrawal of product from the column at a controlled rate.

In the operation of the apparatus of Figure 1 a feed mixture, which may be a liquid multi-component mixture, one component of which crystallizes first upon lowering the temperature of the mixture so as to form crystals contaminated with at least one other component, is pumped from a source, not shown, by pump 12 through line 11 into the upper end of shell 10. The feed mixture in passing into shell 10 through line 11 is deflected laterally as it leaves the conduit by means of baffle member 13 so that the mixture in effect blankets the upper end portion of the shell. A liquid refrigerant, immiscible with the feed mixture and cooled by refrigerating means, not shown, to a temperature below that at which the component to be purified crystallizes, is pumped from a source, not shown, by pump 16 into shell 10 through brine inlet line 14. As a refrigerant it is preferred to use calcium chloride brine, but sodium chloride or similar brines can be used, and it is within the scope of the invention to employ other refrigerating media such as an alcohol-water mixture. By means of header member 17 and its associated nozzles 18, the calcium chloride brine is sprayed upwardly into the upper portion of the cooling chamber where the resulting droplets of brine contact the feed mixture entering the cooling chamber through feed inlet conduit 11. By introducing the materials into the cooling chamber in this manner, a maximum amount of the feed mixture is rapidly brought into contact with cold brine. As a result of intimately contacting the feed mixture with the droplets of cold brine, crystals are formed of the component to be crystallized, and the resulting slurry of crystals in mother liquor and brine flow downwardly through the cooling chamber. In flowing downwardly through the cooling chamber, the slurry and brine are deflected by means of conical baffle member 21 toward the walls of the chamber and away from the openings in conduit 19. The slurry of crystals in mother liquor and the brine separate out in a settling zone maintained in the lower portion of the cooling chamber, the brine settling to the bottom of the chamber and the interface between the slurry and the brine being maintained at a level below the openings in conduit 19. This level is so maintained by means of phase line controller 26 which operates valve 24 in brine outlet line 23 so that a sufficient amount of brine is removed from the cooling chamber in order to maintain the phase line below openings 22. The slurry of crystals in mother liquor is thereby permitted to overflow through openings 22 into conduit 19 while the brine is prevented from entering conduit 19 by maintaining the phase line below the openings.

The slurry of crystals in mother liquor flows downwardly through conduit 19 and thereafter enters filter section 28 where the crystals are separated from mother liquor or lower melting product by removal of the liquor from upper filter 32 through line 43. The crystals, together with occluded impurities, then pass into crystal purification section 29, completely filling this section and forming therein a uniform mass of crystals. The crystal mass gravitates downwardly through the purification section toward a melting zone maintained in the lower portion of the section by heat exchange means 31. By providing a purification column which is frusto-conical in shape resistance to crystal flow which might develop through contact with the walls is decreased and a more efficient gravitating flow of crystals is obtainable.

A heat transfer fluid such as steam introduced into space 66 through line 68 flows upwardly through pipes 64 into dome-like members 58. Thereafter, the steam flows downwardly into space 67 and is subsequently removed therefrom through line 69. By introducing steam in this manner, a melting zone is maintained in the lower portion of purification section 29. Sufficient steam is introduced so as to maintain a temperature in the melting zone at least as high as the melting point of the crystals.

Upon reaching the melting zone the crystals are melted and a portion only of the resulting liquid is withdrawn through line 54 as product while the remainder of the liquid is displaced upwardly as a reflux stream into the downwardly moving mass of crystals and in intimate contact therewith. A stream comprising impurities displaced from the crystals by the reflux is removed through lower filter 33 by means of line 48.

The reflux stream passes countercurrently to the movement of crystals through the combined effect of withdrawing only a portion of the liquid from the melting zone and the liquid displacing action of the mass of crystals gravitating downwardly through purification section 29. The high purity of product obtainable is believed to be due primarily to the action of the reflux stream passing upwardly into the purification section in intimate contact with the crystals and refreezing thereon. The refreezing results in the displacement of occluded impurities which pass upwardly through the purification section and are removed through lower filter section 33. The amount of reflux which is required to produce a higher melting product of 99+ percent purity will depend upon the physical and chemical characteristics of the crystals and the amount of occluded impurities therein. While it is preferred to maintain the amount of reflux in the range of 10 to 50 percent of the liquid resulting from melting the crystals, it is possible to operate with a reflux as low as 5 percent and as high as 60 percent or greater in some instances.

Provision is made for recycling a desired portion of the displaced liquid stream and/or the lower melting product to the feed inlet conduit. Thus, a controlled amount of liquid may be passed through line 48 to feed inlet conduit 11 on the suction side of pump 12, or a controlled amount of mother liquor may be pumped through line 46 to conduit 11 on the discharge side of pump 12. Alternatively, the mother liquor may be passed through lines 51 and 48 into inlet conduit 11. In the usual operation of the apparatus, however, it will not be desirable to recycle the displaced liquid stream or the mother liquor stream for the reason that these streams will generally contain an insufficient amount of the crystallizable component to warrant recycling. It may, however, in certain cases, be desirable to recycle the streams in order to increase the downward force on the slurry within conduit 19 by increasing the velocity thereof as a result of introducing a greater volume of liquid into the cooling chamber. It is noted in this regard that recycling of the liquid in this manner will necessitate lower temperatures in the cooling zone in order to effect the desired crystallization.

The operation of the apparatus of Figure 2 is essentially the same as that of Figure 1. In this modification a substantially cylindrical purification section 82 is utilized in conjunction with an electrical heater 84. It is also within the contemplation of the invention to utilize the crystal forming method of this invention in conjunction with fractional crystallization apparatus which employs mechanical means, e.g., a reciprocating piston or auger, to move the crystals through the crystal separation and purification column. When so operating with an apparatus employing a crystal mover, it is advantageous to position the separation and purification column in a horizontal position so that the slurry of crystals in mother liquor may flow downwardly from the cooling chamber into one end of the column where the slurry is contacted with the crystal mover. Furthermore, it is to be understood that the crystal forming apparatus of this invention can be used separately or with other types of apparatus such as centrifuges without departing from the scope of the invention.

The following illustrative example, which is not intended to unduly limit the scope of the invention, will provide a more comprehensive understanding of the invention.

In accordance with this example, utilizing fractional crystallization apparatus similar to that shown in Figure 1, a 2-component hydrocarbon feed mixture consisting of 62 weight percent benzene and the balance normal heptane is introduced into the upper portion of the cooling chamber. Simultaneously with the introduction of the feed mixture, a calcium chloride brine cooled to a temperature of about —44° F. is sprayed upwardly into the downwardly flowing feed mixture. Upon contact between the hydrocarbon feed mixture and the brine, a slurry of benzene crystals in mother liquor is formed. The slurry and the brine are separated in the lower portion of the cooling chamber, and the slurry then flows downwardly into a filter zone where the crystals are separated from mother liquor. The resulting uniform mass of crystals moves downwardly through the purification section countercurrent to a reflux stream flowing upwardly from the melting zone. A higher melting product having a composition of about 99.0 weight percent benzene is recovered from the melting zone.

By carrying out the separation and purification process as described above, it is possible to obtain a high purity product. Furthermore, by forming the crystals in accordance with the method of this invention, it is possible to eliminate the bulky scraped surface chiller which is commonly used in the practice of fractional crystallization processes.

As will be evident to those skilled in the art various modifications of this invention can be made or followed in the light of the foregoing disclosure and discussion without departing from the spirit or scope of the invention.

I claim:

1. Apparatus for producing crystals which comprises, in combination, a closed, upright shell; means for introducing a liquid feed laterally into the upper end portion of said shell; means for spraying a refrigerant upwardly into the upper end portion of said shell, said means being disposed below said liquid feed introduction means; a central conduit means extending from an intermediate portion of said shell downwardly through the lower end of said shell; a baffle means attached to the upper end of said conduit means and spaced apart from the walls of said shell; means for introducing solids and liquid into an upper portion of said conduit means below said baffle means and said upper end of said conduit means; and means for withdrawing refrigerant at a controlled rate from the bottom of said shell.

2. In fractional crystallization apparatus comprising a cooling chamber, a crystal purification column in communication with said cooling chamber, a filtering means in one end of said column and a heat exchange means operatively connected to the other end of said column, the improvement of a cooling chamber comprising a closed container; feed inlet means in the upper portion of said container; liquid deflecting means adjacent said feed inlet means; means for spraying refrigerant upwardly into the upper portion of said container, said means being below and adjacent said feed inlet means; a central conduit means extending from an intermediate portion of said container downwardly through the lower end of said container; a baffle means attached to the upper end of said conduit means and spaced apart from the walls of said container; means for introducing solids and liquid into an upper portion of said conduit means below said baffle means and said upper end of said conduit means; and means for withdrawing refrigerant from the lower portion of said container.

3. Fractional crystallization apparatus which comprises, in combination, a closed, upright shell; means for introducing a liquid feed laterally into the upper end portion of said shell; means for spraying a refrigerant upwardly into the upper end portion of said shell, said means being disposed below said liquid feed introduction means; central conduit means extending from an intermediate portion of said shell downwardly through the lower end of said shell; a baffle means attached to the upper end of said conduit means and spaced apart from the walls of said shell; means for introducing solids and liquid into an upper portion of said conduit means below said baffle means and said upper end of said conduit means; means for withdrawing refrigerant at a controlled rate from the bottom of said shell; means for separating liquid from crystals communicating with the lower end of said conduit means; a liquid outlet connected to said separating means; a crystal purification chamber in communication with said separating means; a heat exchange means operatively connected to the lower end of said purification chamber; and a liquid outlet in the lower end of said purification chamber.

4. Fractional crystallization apparatus which comprises, in combination, a closed, upright shell; a feed inlet conduit connected to the upper end of said shell and extending thereinto to a level below the upper end of said shell; a substantially horizontal baffle member attached to and adjacent the end of said feed inlet conduit disposed within said shell, said baffle member being adapted to deflect liquid outwardly toward the sides of said shell upon introduction thereinto through said conduit; a refrigerant inlet conduit connected to and extending horizontally into the upper portion of said shell; a header member attached to said refrigerant inlet conduit within said shell, said header member being disposed below said feed inlet conduit; a plurality of nozzles attached to said header member, said nozzles being adapted to spray refrigerant upwardly into the upper end portion of said shell; a slurry outlet conduit connected to the lower end of said shell and extending upwardly thereinto to an intermediate, central portion of said shell; a plurality of openings formed in the upper end portion of said slurry outlet conduit communicating said shell with the interior of said conduit; a substantially conical baffle member attached to the upper end of said slurry outlet conduit, the periphery of said baffle member being spaced apart from the walls of said shell; a refrigerant outlet conduit attached to the lower end of said shell; a flow control means in said refrigerant outlet conduit; a phase line controller operatively connected to said shell and to said flow control means; means for separating liquid from crystals communicating with the lower end of said slurry outlet conduit; a liquid outlet connected to said separating means; a frusto-conical crystal purification chamber in comunication with said separating means; a heat exchange means operatively connected to the lower end of said purification chamber; and a liquid outlet in the lower end of said purification chamber.

5. Fractional crystallization apparatus which comprises, in combination, a closed upright shell; means for introducing a liquid feed laterally into the upper end portion of said shell; means for spraying a refrigerant upwardly into the upper end portion of said shell, said means being disposed below said liquid feed introduction means; conduit means extending from a central portion of said shell downwardly through the lower end of said shell; a baffle member attached to the upper end of said conduit means and spaced apart from the walls of said shell; means for introducing solids and liquid into the upper portion of said conduit means; means for withdrawing refrigerant at a controlled rate from the bottom of said shell; a first filter for separating liquid from crystals positioned below and communicating with the lower end of said conduit means; a first liquid outlet means connected to said first filter; a second filter for separating liquid from crystals positioned below and communicating with said first filter; a second liquid outlet means connected to said second filter; a crystal purification chamber frusto-conical in shape, closed at its lower end and communicating at its upper end with said second filter; a first cylindrical member having its upper end attached to the lower end of said purification chamber; a first closure member attached to and closing the lower end of said first cylindrical member; a second cylindrical member having its upper end attached to said first closure member; a second closure member attached to and closing the lower end of said second cylindrical member; a plurality of substantially cylindrical members extending from the lower end of said purification chamber upwardly into the lower portion of said purification chamber, said substantially cylindrical members being closed at their upper end by a dome-like closure member and open at their lower end and communicating with the space encompassed by said lower end of said purification chamber, said first cylindrical member and said first closure member; pipes extending upwardly from said first closure member into each said substantially cylindrical members, the lower end of each said pipes being open to the space encompassed by said second cylindrical member and said first and second closure members; inlet means connected to said second cylindrical member; outlet means connected to said first cylindrical member; and outlet means connected to the lower end of said purification chamber.

References Cited in the file of this patent

UNITED STATES PATENTS

| | | |
|---|---|---|
| 1,431,394 | Gould | Oct. 10, 1922 |
| 2,081,287 | Aldridge | May 25, 1937 |
| 2,315,762 | Ax et al. | Apr. 6, 1943 |
| 2,666,304 | Ahrel | Jan. 19, 1954 |
| 2,683,178 | Findlay | July 6, 1954 |
| 2,724,508 | Luther | Nov. 22, 1955 |
| 2,768,221 | Findlay | Oct. 23, 1956 |

FOREIGN PATENTS

| | | |
|---|---|---|
| 133,959 | Australia | May 24, 1946 |